(12) United States Patent
Roppelt

(10) Patent No.: US 10,570,711 B2
(45) Date of Patent: Feb. 25, 2020

(54) SEMI-PERMEABLE EXPANDING SLEEVE SYSTEM FOR BOREHOLE PIPE SPREADING CONFIGURATIONS AND METHOD OF SPREADING PIPES IN A BOREHOLE

(71) Applicant: Michael Roppelt, Edmonton (CA)

(72) Inventor: Michael Roppelt, Edmonton (CA)

( * ) Notice: Subject to any disclaimer, the term of this patent is extended or adjusted under 35 U.S.C. 154(b) by 62 days.

(21) Appl. No.: 15/888,261

(22) Filed: Feb. 5, 2018

(65) Prior Publication Data

US 2019/0112901 A1    Apr. 18, 2019

(30) Foreign Application Priority Data

Oct. 17, 2017    (CA) .................................. 2 982 652

(51) Int. Cl.
*E21B 43/10* (2006.01)
*E21B 33/13* (2006.01)
*F24T 10/15* (2018.01)
*F24T 10/00* (2018.01)

(52) U.S. Cl.
CPC ............ *E21B 43/108* (2013.01); *E21B 33/13* (2013.01); *F24T 10/15* (2018.05); *F24T 2010/53* (2018.05)

(58) Field of Classification Search
CPC .......... E21B 43/108; E21B 23/00; E21B 33/13
See application file for complete search history.

(56) References Cited

U.S. PATENT DOCUMENTS

| | | | | |
|---|---|---|---|---|
| 6,135,204 A | * | 10/2000 | McCabe | ............... E21B 33/127 166/250.17 |
| 2004/0194914 A1 | * | 10/2004 | Johnson, Jr. | ............ E21B 23/00 165/45 |
| 2010/0193124 A1 | * | 8/2010 | Nicolas | ................... E21B 29/10 156/294 |

* cited by examiner

*Primary Examiner* — Kristyn A Hall
(74) *Attorney, Agent, or Firm* — Davis & Bujold PLLC; Michael J. Bujold

(57) ABSTRACT

A semi-permeable expanding sleeve system for pipe spreading in a borehole is disclosed. The system has an expansion sleeve, a grout injection pipe and a high-solids grout mixture. The expansion sleeve has a top end and a bottom end. The grout injection pipe has a first end, a second end, an inlet and at least one outlet. The grout injection pipe is insertable through the open top end of the expansion sleeve such that the at least one outlet is positionable within the expansion sleeve and the inlet is positionable adjacent the top end of the expansion sleeve. The grout mixture is pumped through the grout injection pipe into the expansion sleeve using a pump. A closing mechanism is provided for closing the expansion sleeve around the grout injection pipe to create a semi-permeable enclosure.

25 Claims, 17 Drawing Sheets

SEMI-PERMEABLE EXPANDING SLEEVE SYSTEM FOR BOREHOLE PIPE SPREADING CONFIGURATIONS AND METHOD OF SPREADING PIPES IN A BOREHOLE

FIELD OF THE DISCLOSURE

The present application relates generally to a spacer for a vertical ground heat exchanger utilizing vertical closed-loops within each borehole. More specifically, this application relates to a spacer for use in geo-exchange systems that can operate using this type of ground heat exchanger.

BACKGROUND

This section provides background information to facilitate a better understanding of the various aspects of the invention. It should be understood that the statements in this section of this document are to be read in this light, and not as admissions of prior art.

A vertical ground heat exchanger comprises at least one vertically-drilled hole (borehole) in a geological formation. Depending upon the application and contractor preferences, boreholes can vary in diameter and depth to a significant degree.

The borehole contains one or more vertical closed loops (VCLs), each comprising two pipes joined at the bottom of the hole with a u-shaped bend or fitting. The vertical closed loops (VCLs) are connected at the top of the hole to the supply and return sections of a fluid transfer system. The vertical closed loops (VCLs) and fluid transfer system are used to transport a heat transfer fluid that will carry heat to or from the geological formation.

Installation of vertical closed loops (VCLs) is followed by filling of the voids in the drilled borehole with a grouting material to provide a suitable medium for transfer of heat between the VCLs and the ground and to seal the borehole. Properly sealing the borehole by grouting the void space between the vertical closed loops piping and the borehole will protect aquifers from contamination and loss of natural artesian pressure. Grouting material is conveyed to the entire depth of the drilled borehole through use of a tremie line that is typically pulled up during the grouting process to reduce pumping pressure.

An important factor in the efficiency of a vertical ground heat exchanger is the proximity between the vertical closed loop pipes used to transfer heat to and from the geological formation and the wall of the borehole in the formation. Basic and conventional systems, shown in FIG. 1, make no particular effort to improve this proximity.

Referring to FIG. 2, a known method of improving proximity between the pipes and the geological formation is to use mechanical clip spacers. U-tubes with mechanical clip spacers in vertical ground heat exchangers improve the proximity and the benefits of improving this proximity are well documented: adding 20-35% higher efficiency by reducing thermal resistance in the borehole. The current practice of using plastic/metal clips at spaced intervals in the ground lacks uniformity in the amount of spreading.

BRIEF SUMMARY

There is provided a semi-permeable expanding sleeve system for pipe spreading in a borehole has an expansion sleeve, a grout injection pipe, a grout mixture and a pump suitable for handling the grout. The expansion sleeve has a top end and a bottom end. The grout injection pipe has a top end, a bottom end, an inlet and at least one outlet. The grout injection pipe is insertable through the top end of the expansion sleeve such that the at least one outlet is positioned within the expansion sleeve and the inlet is positioned adjacent the top end of the expansion sleeve. The grout mixture is pumped through the grout injection pipe and into the expansion sleeve using a pump. A closing mechanism is provided for closing the expansion sleeve around the grout injection pipe.

In one embodiment, the expansion sleeve is made of a loose weave fabric that has gaps between fibers of 0.03-0.08 inches. This size of gap allows smaller-sized solids to pass through it easily while reducing or preventing passage of larger solids, leading to the characterization of the sleeve as "semi-permeable". Natural, untreated burlap fabric is one example of an acceptable fabric that can be used. Any fabric material will deteriorate in the wet, earthy conditions of the grouted borehole but natural, untreated burlap will do so quickly, without leaving behind chemical residues.

In one embodiment, the expansion sleeve is the same length as the pipes to be spread. This may allow for a more uniform spreading of the pipes when the expansion sleeve is filled with grout. The expansion sleeve may also have a diameter equal to the diameter of the borehole minus two times the outer diameter of the smallest pipe within the borehole.

In one embodiment, the grout injection pipe is made of plastic.

In one embodiment, the grout injection pipe has a plurality of outlets along a length of the grout injection pipe.

In one embodiment, the grout mixture is a high-solids mixture, meaning that at least 50% of the volume of the mixture is made up of solid material comprising bentonite (clay) grout and sand.

In one embodiment, the pump is a positive-displacement pump.

There is also provided a method of spreading pipes in a borehole. An expansion sleeve and grout injection pipe are provided. The expansion sleeve has a top end and a bottom end and the grout injection pipe has a top end, a bottom end, an inlet and at least one outlet. The grout injection pipe is inserted into the expansion sleeve through the first end of the expansion sleeve such that the at least one outlet of the grout injection pipe is adjacent the bottom end of the expansion sleeve. The inlet of the grout injection pipe protrudes from the top end of the expansion sleeve. The bottom end of the expansion sleeve is closed to create a semi-permeable enclosure. The semi-permeable enclosure is inserted into a borehole that has pipes to be spread. The semi-permeable enclosure is positioned in a central location of the borehole relative to the pipes to be spread. A grout mixture is pumped through the inlet of the grout injection pipe such that it travels through the at least one outlet of the grout injection pipe into the expansion sleeve. This causes the expansion sleeve to fill with grout and forces the pipes outward towards a wall of the borehole as the expansion sleeve expands.

In one embodiment, a further step of closing the top end of the expansion sleeve around the grout injection pipe is completed.

In one embodiment, the expansion sleeve is closed around the grout injection pipe with a clamp.

In one embodiment, the expansion sleeve is made of a loose weave fabric that has gaps between fibers of 0.03-0.08 inches. Burlap fabric is one example of an acceptable fabric that can be used.

In one embodiment, the expansion sleeve is the same length as the pipes to be spread. This may allow for a more uniform spreading of the pipes when the expansion sleeve is filled with grout. The expansion sleeve may also have a diameter equal to the diameter of the borehole minus two times the outer diameter of the smallest pipe within the borehole.

In one embodiment, the grout injection pipe is made of plastic.

In one embodiment, a grout pipe cap is used to seal the bottom end of the grout injection pipe.

In one embodiment, the grout injection pipe has a plurality of outlets along a length of the grout injection pipe.

In one embodiment, the grout mixture is high-solids mixture, meaning that at least 50% of the volume of the mixture is made up of solid material comprising bentonite (clay) grout and sand.

In one embodiment, the pump is a positive displacement pump.

In one embodiment, there is a further step of trimming the open top end of the expansion sleeve to allow the inlet of the grout injection pipe to protrude from the expansion sleeve.

In one embodiment, there is a further step of connecting the inlet of the grout injection pipe to a water supply system for maintaining water content within the grout mixture and geological form in which the borehole is made.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

Figure 1:
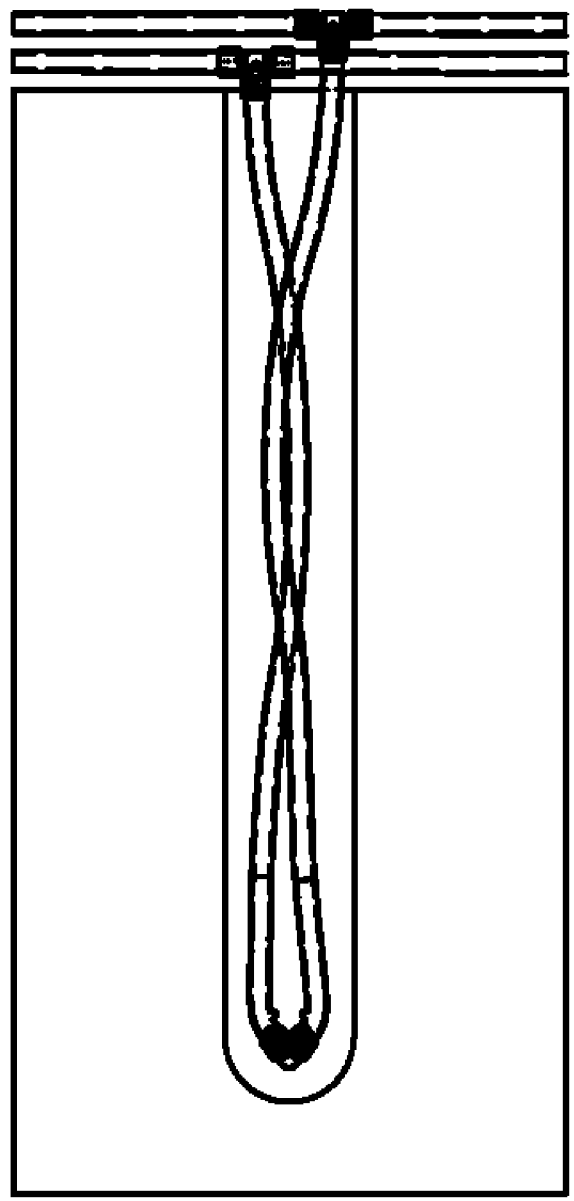
FIG. 1 is a side elevation view of a conventional borehole with U-tube pipes inserted.
Figure 2:
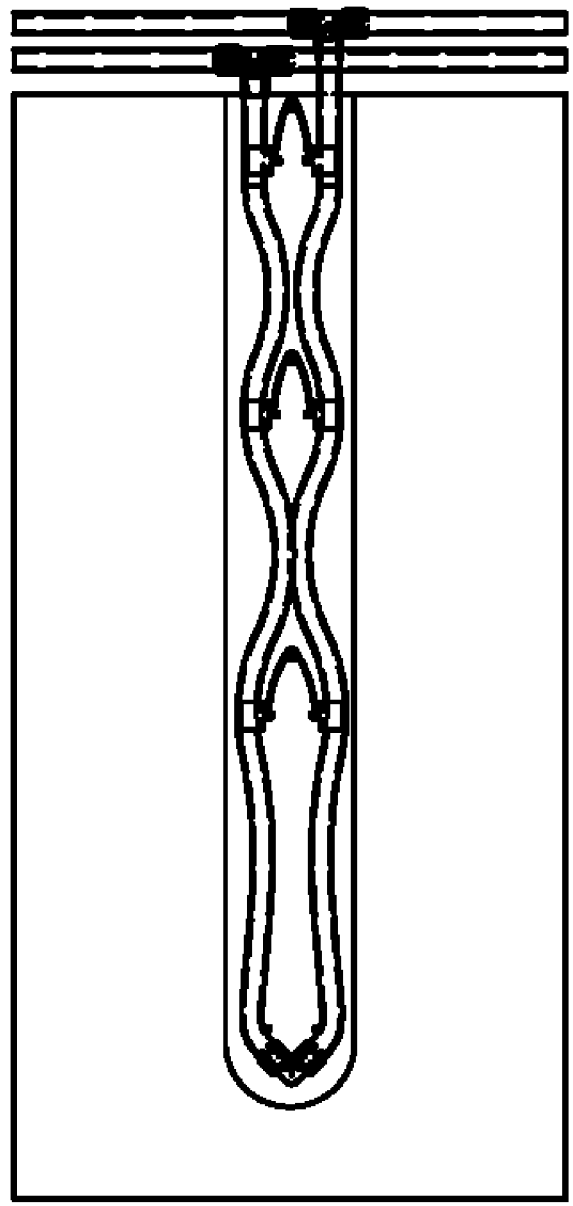
FIG. 2 is a side elevation view of a borehole with U-tube pipes inserted and spaced with spacers.

A semi-permeable expanding sleeve system, generally identified by reference numeral 10, will now be described with reference to FIG. 3 through FIG. 21.

Figure 3:
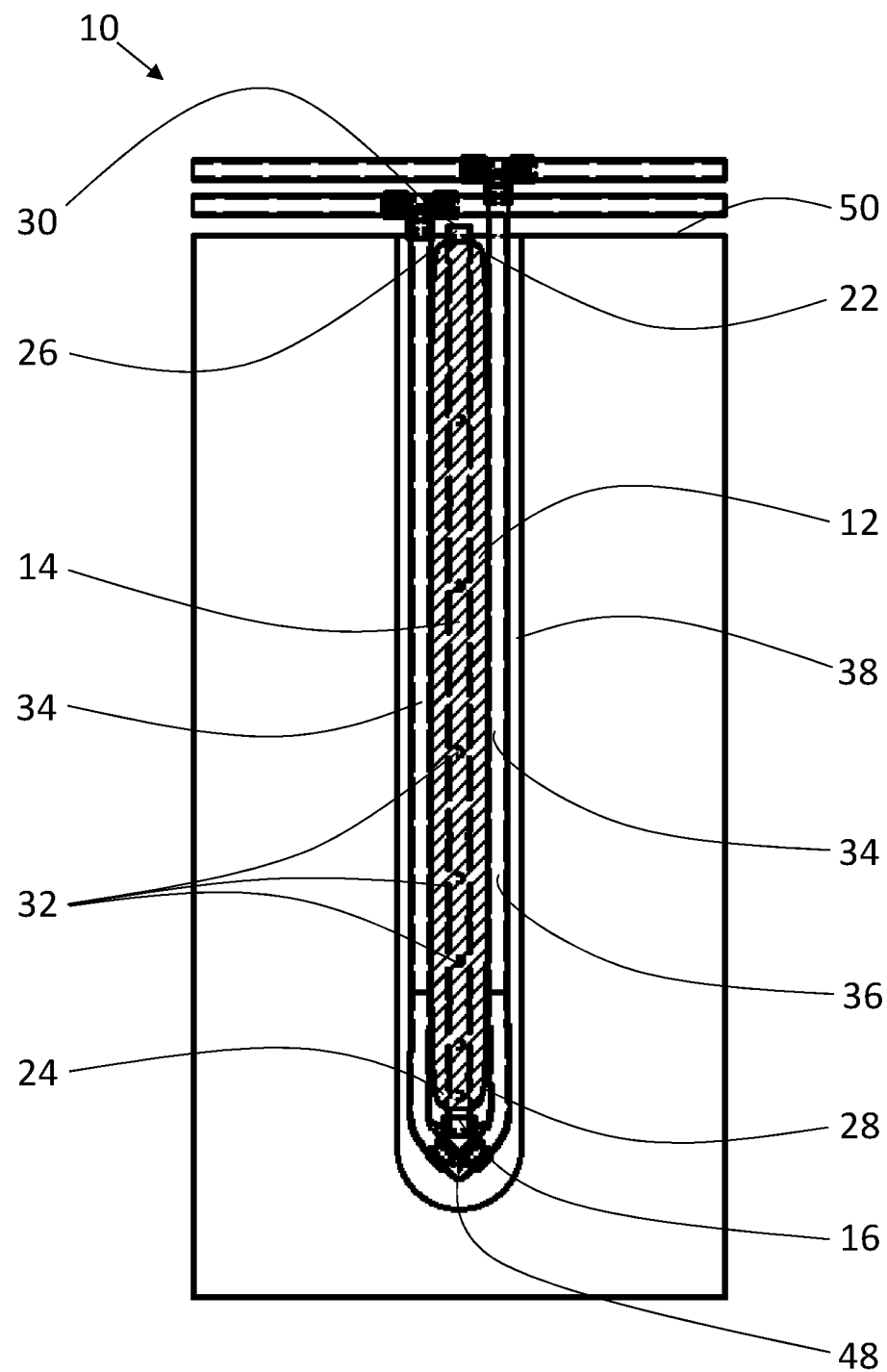
FIG. 3 is a side elevation view of a semi-permeable expanding sleeve installed within a borehole.
Figure 4:
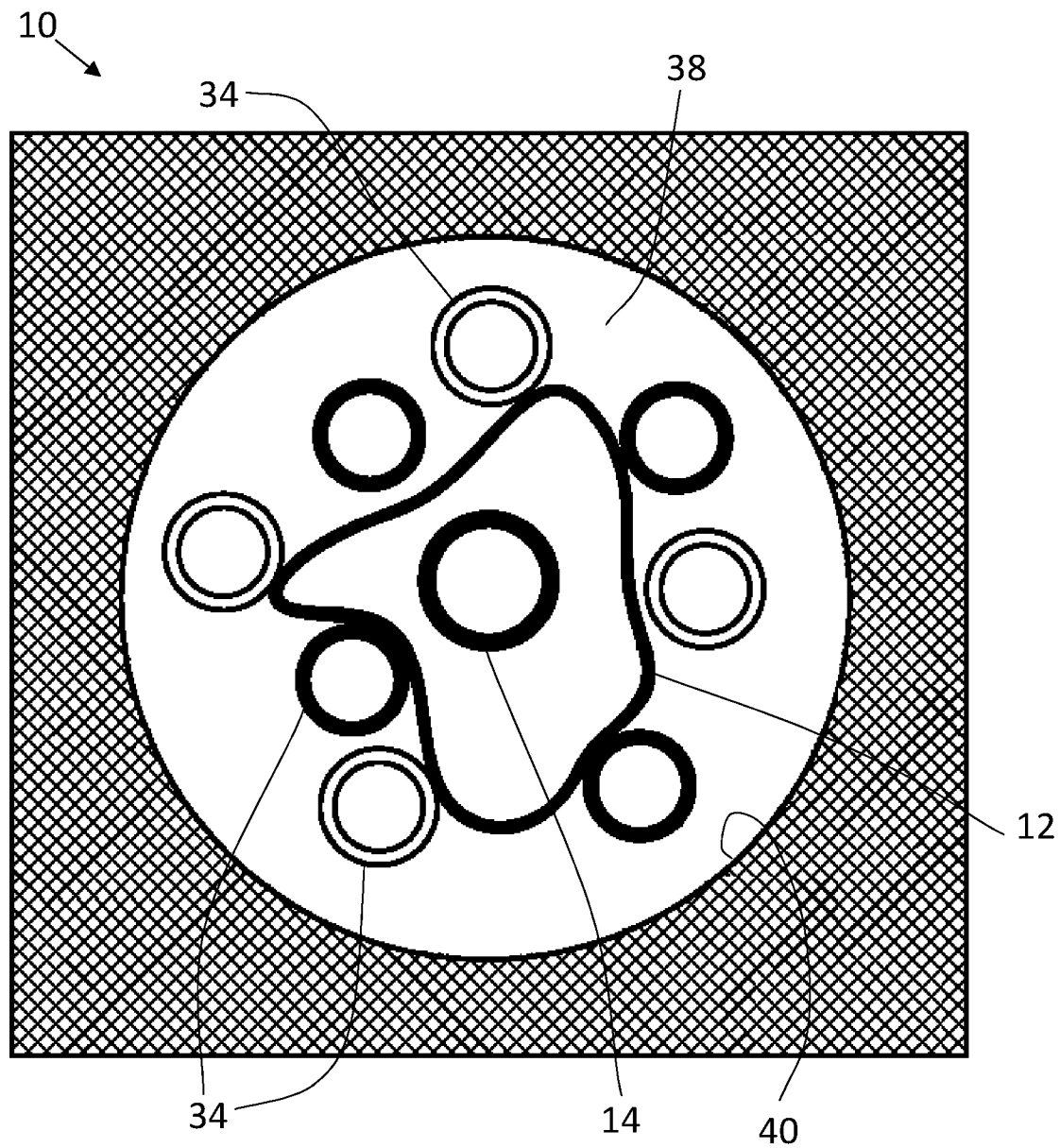
FIG. 4 is a top plan view of the semi-permeable expanding sleeve installed within a borehole prior to pumping in grout.
Figure 5:
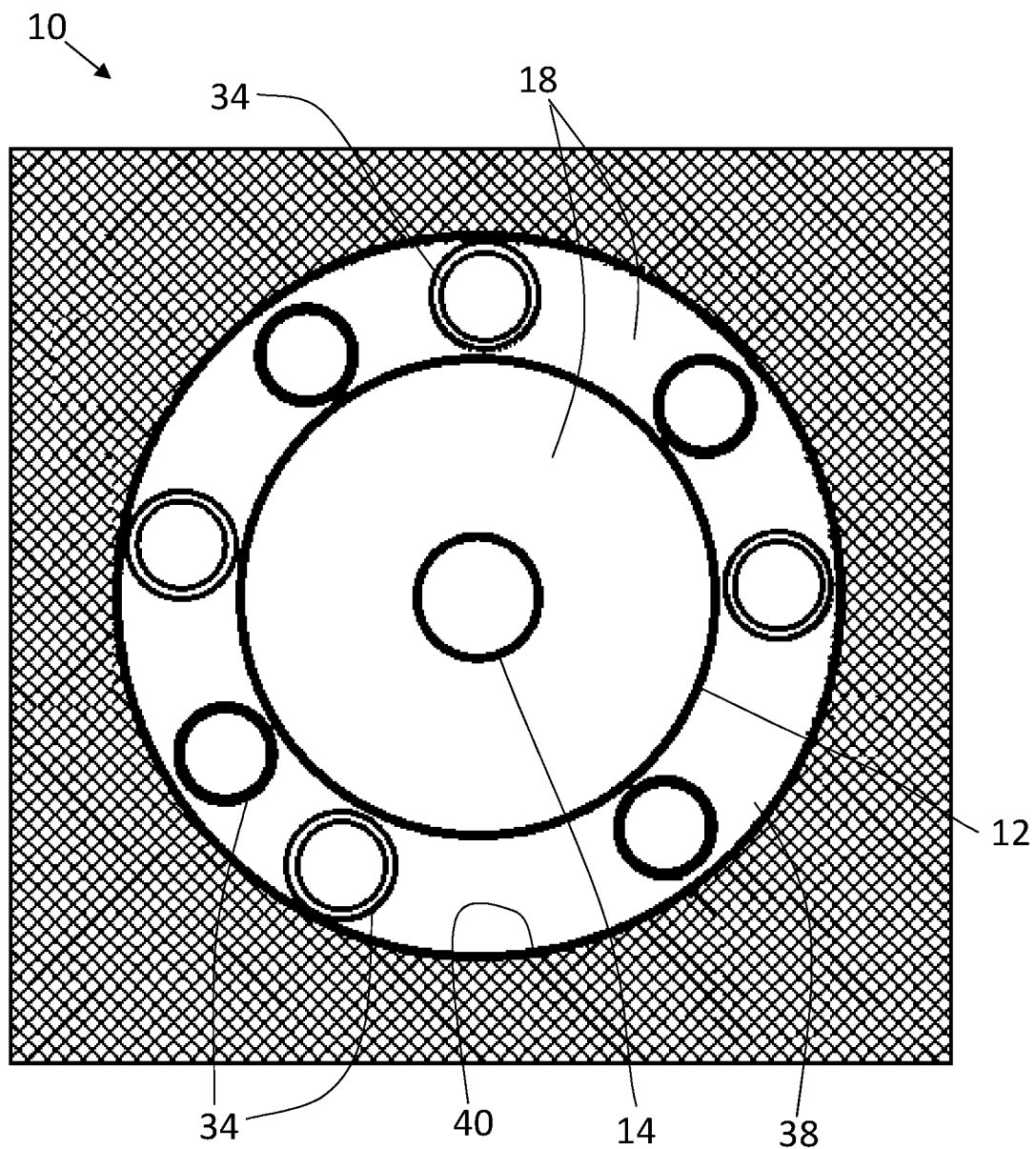
FIG. 5 is a top plan view of the semi-permeable expanding sleeve installed within the borehole after grouting is completed.

Referring to FIG. 3, semi-permeable expanding sleeve system 10 has an expansion sleeve 12, a grout injection pipe 14, a grout mixture 18 and a pump 20. Expansion sleeve 12 has a top end 22 and a bottom end 24. Grout injection pipe 14 has a top end 26, a bottom end 28, an inlet 30 and an outlet 32. Grout injection pipe 14 is inserted through open top end 22 of expansion sleeve 12 such that outlet 32 is positioned within expansion sleeve 12 and inlet 30 is positioned adjacent top end 22 of expansion sleeve 12. Grout mixture 18 is made up of water, silica sand and powdered bentonite clay. Pump 20 pumps grout mixture 18 through grout injection pipe 14 and into expansion sleeve 12. A positive-displacement pump is effective in system 10. System 10 is generally used to spread pipes 34 of vertical closed-loops (VCLs) 36 placed within a borehole 38. As can be seen in FIG. 4, prior to expansion of expansion sleeve 12, pipes 34 are unevenly spaced and positioned at a distance from borehole walls 40. Referring to FIG. 5, after expansion of expansion sleeve 12, pipes are pushed adjacent borehole walls 40.

Referring to FIG. 3, in the embodiment shown, expansion sleeve 12 is made of a coarse fabric with a loose weave containing gaps of 0.03-0.08 inches (0.762-2.032 mm) between fibers. An example of an appropriate material is natural, untreated burlap with a fabric weight of approximately 10 ounces per square yard (339 g/m$^2$). In one embodiment, expansion sleeve 12 is substantially the same length as pipes 34 to be spread and the diameter of the expansion sleeve 12 is substantially the same as the diameter of the borehole.

Figure 8:
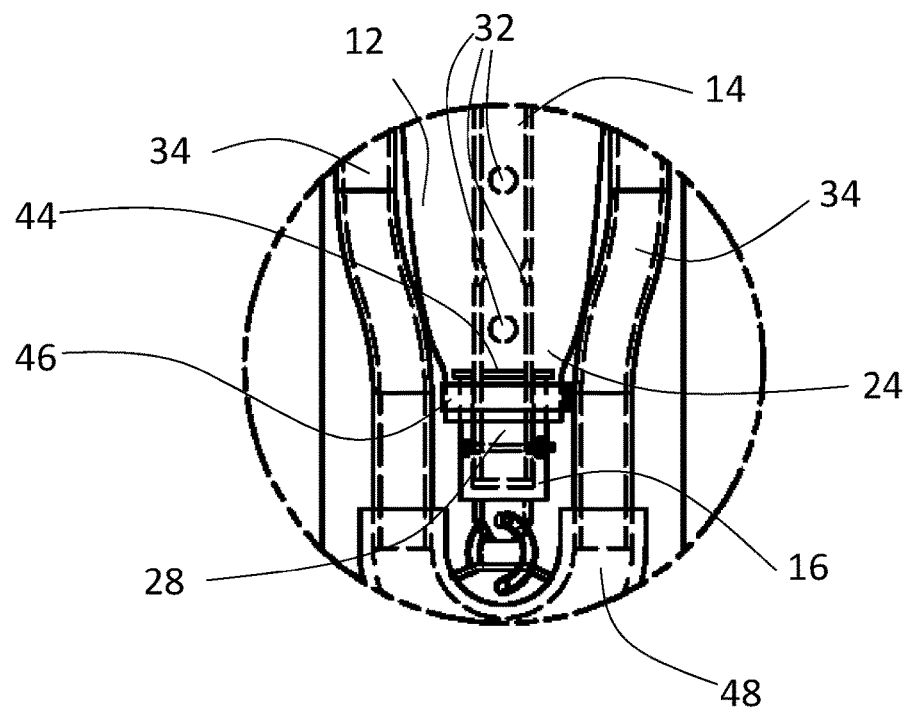
FIG. 8 is a detailed view of the bottom end of the semi-permeable expanding sleeve shown in FIG. 6.

When making expansion sleeve 12, fabric needs to be cut to a length just slightly longer than the pipes to be spread. This allows for easy manipulation of expansion sleeve 12 when preparing for grouting. The cut width should be within an approximate range as follows. Referring to FIG. 8, the maximum cut width would be approximately the circumference of the circle defined by the borehole wall 40. Specifically, Max Cut Width=π*(borehole diameter)+seam allowance. The minimum cut width would be at least the circumference of a circle defined by the borehole wall 40 and the pipes 34 of the VCL. Specifically, Min Cut Width=π*(borehole diameter−2*pipe diameter)+seam allowance. A cut width outside of this range can impair the function of the expansion sleeve. Once the sleeve fabric is cut to the desired length and width, the sleeve fabric is sewn into a sleeve. The fabric is folded along its long edge and the fabric is sewn together along its length. The bottom end of the fabric may be sewn together to create a closed bottom end 24 of expansion sleeve 12 or bottom end 24 may remain open. Once sewn, expansion sleeve 12 is turned inside out so that the seam allowance is on the inside of expansion sleeve 12.

Grout injection pipe 14 is similar to what is known as a tremie line 42 in the geo-exchange industry. However, grout injection pipe 14 differs in configuration and use when compared to configuration and use of tremie lines 42. In one embodiment, grout injection pipe 14 is constructed from a 1 inch diameter high-density polyethylene (HDPE) pipe. Preferably, grout injection pipe 14 is cut to a length longer than expansion sleeve 12, 2-3 feet longer than expansion sleeve 12 would be an acceptable length. Referring to FIG. 3, in the embodiment shown, grout injection pipe 14 has top end 26 and bottom end 28. Top end 26 doubles as inlet 30 while bottom end 28 is capped with a grout pipe cap 16. A plurality of outlets 32 with a diameter of 0.5 inches (1.25 cm) are drilled through the side 37 of grout injection pipe 14 at various distances along the length of grout injection pipe 14. In one embodiment, outlets 32 are drilled every 1.5 feet for 9 feet, then every 3 feet for an additional 30 feet and then every 6 feet for an additional 60 feet. These measurements start from capped bottom end 28 of grout injection pipe 14. This configuration reduces the resistance at lower elevations in borehole 38 and encourages preferential flow at the lowest convenient elevation while allowing for easier filling of borehole 38 and reducing pumping pressure. A person of skill will understand that top end 26 of grout injection pipe 14 may double as inlet 30 and bottom end 28 of grout injection pipe 14 may double as outlet 32, when outlet 32 is not capped. It will also be understood that grout injection pipe 14 can be different lengths and that the positioning of multiple outlets 32 along the length of grout injection pipe 14 may be different from what is described above.

Grout mixture 14 is a high-solids grout mixture. Grout is used in the geo-exchange industry to fill and seal voids in boreholes 38. The high-solids grout mixture is a combination of water, dry silica sand and powdered bentonite clay grout. The silica sand is preferably 30-70 mesh. When grout mixture 14 is mixed, the bentonite clay absorbs the water and expands to create a suspension of the solid sand within a viscous, gelatinous fluid. A variety of different ratios may be used to create the high-solids grout mixture 14, as long as the mixture contains at least 50% solids by volume and at least 25% sand by volume. The function of expansion sleeve 12 is partially dependent on the composition of the grout mixture 18 used to fill expansion sleeve 12. The solids in the mixture are comprised of a mix of clay and sand. When pumped into expansion sleeve 12, the clay solids will tend to pass through expansion sleeve 12 while the sand solids will remain inside expansion sleeve 12. A mixture containing at least 50% solids by volume and at least 25% sand by volume allows for the proportion of material that passes through expansion sleeve 12 to be balanced against the material that remains inside expansion sleeve 12. This balance helps to ensure that expansion sleeve 12 expands and is filled at the similar rate to void between expansion sleeve 12 and borehole wall 40. It can help to prevent borehole 38 from filling with grout 18 before expansion sleeve 12 has filled and expanded, allowing expansion sleeve 12 to work as intended. IT may also prevent expansion sleeve 12 from becoming full before borehole 38 is fully grouted, creating voids in borehole 38 that are unfilled and unsealed or requiring additional pumping into expansion sleeve 12 that may cause a rupture in expansion sleeve 12.

Figure 6:
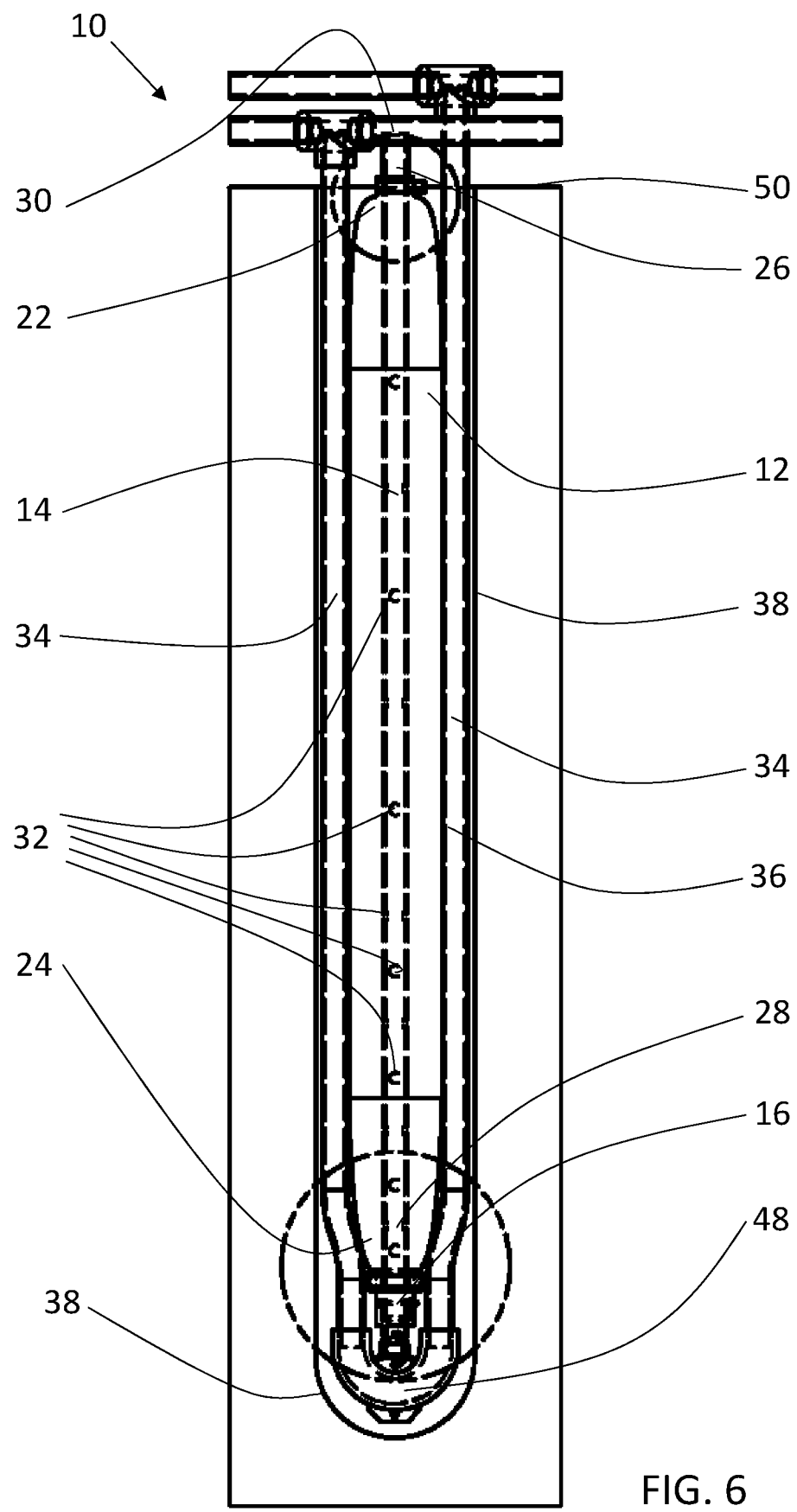
FIG. 6 is a side elevation view, partially in section, of an embodiment of the semi-permeable expanding sleeve system installed within a borehole.
Figure 7:
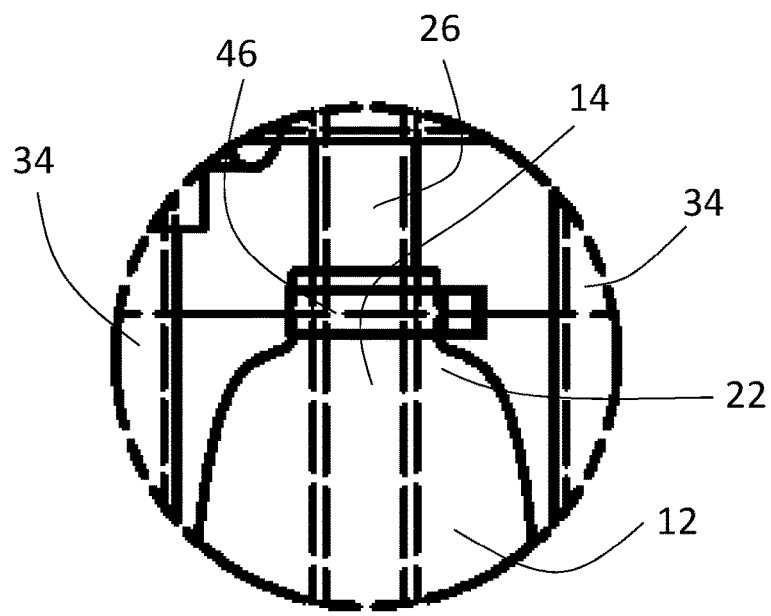
FIG. 7 is a detailed view of the top end of the semi-permeable expanding sleeve shown in FIG. 6.

Once expansion sleeve 12 is sewn and grout injection pipe 14 is cut and drilled, grout injection pipe 14 is inserted into expansion sleeve 12. Referring to FIGS. 6-8, in the embodiment shown, bottom end 28 of grout injection pipe 14 protrudes from bottom end 24 of expansion sleeve 12 by approximately 2 inches. Bottom end 28 is capped by grout pipe cap 16. A flange 44 around the open end of grout pipe cap 16 is positioned inside expansion sleeve 12. As shown in FIG. 8, flange 44 prevents a closure mechanism 46 from sliding off bottom end 28 of grout injection pipe 14. Top end 26 of grout injection pipe 14 protrudes from top end 22 of expansion sleeve 12 by a small amount, defined only as that required to ease manipulation of expansion sleeve 12 and grout injection pipe 14 for grouting. In this embodiment, top end 26 of grout injection pipe 14 doubles as inlet 30 of grout injection pipe 14.

Expansion sleeve 12 is closed around grout injection pipe 14 using grout pipe cap 16. Expansion sleeve 12 is closed around grout pipe cap 16 below flange 43 of grout pipe cap 16 such that flange 44 prevents closure mechanism 46 from sliding off grout pipe cap 16. This results in outlets 32 being positioned within expansion sleeve 12 and inlet 30 being positioned adjacent and exterior to expansion sleeve 12. Closure mechanism 46 can take the form of clamps, twine, rope, tape, or other appropriate devices known in the art to minimize leakage between grout injection pipe 14 and expansion sleeve 12. Closure at bottom end 24 of expansion sleeve 12 should be located between bottom end 28 of grout injection pipe 14 and outlet 32 positioned closest to bottom end 28 of grout injection pipe 14. Expansion sleeve 12 is also closed around grout injection pipe 14 near top end 26. Expansion sleeve 12 closure can be located at any convenient location near top end 26 of grout injection pipe 14. All outlets 32 of grout injection pipe 14 should be contained within expansion sleeve 12.

Figure 9:
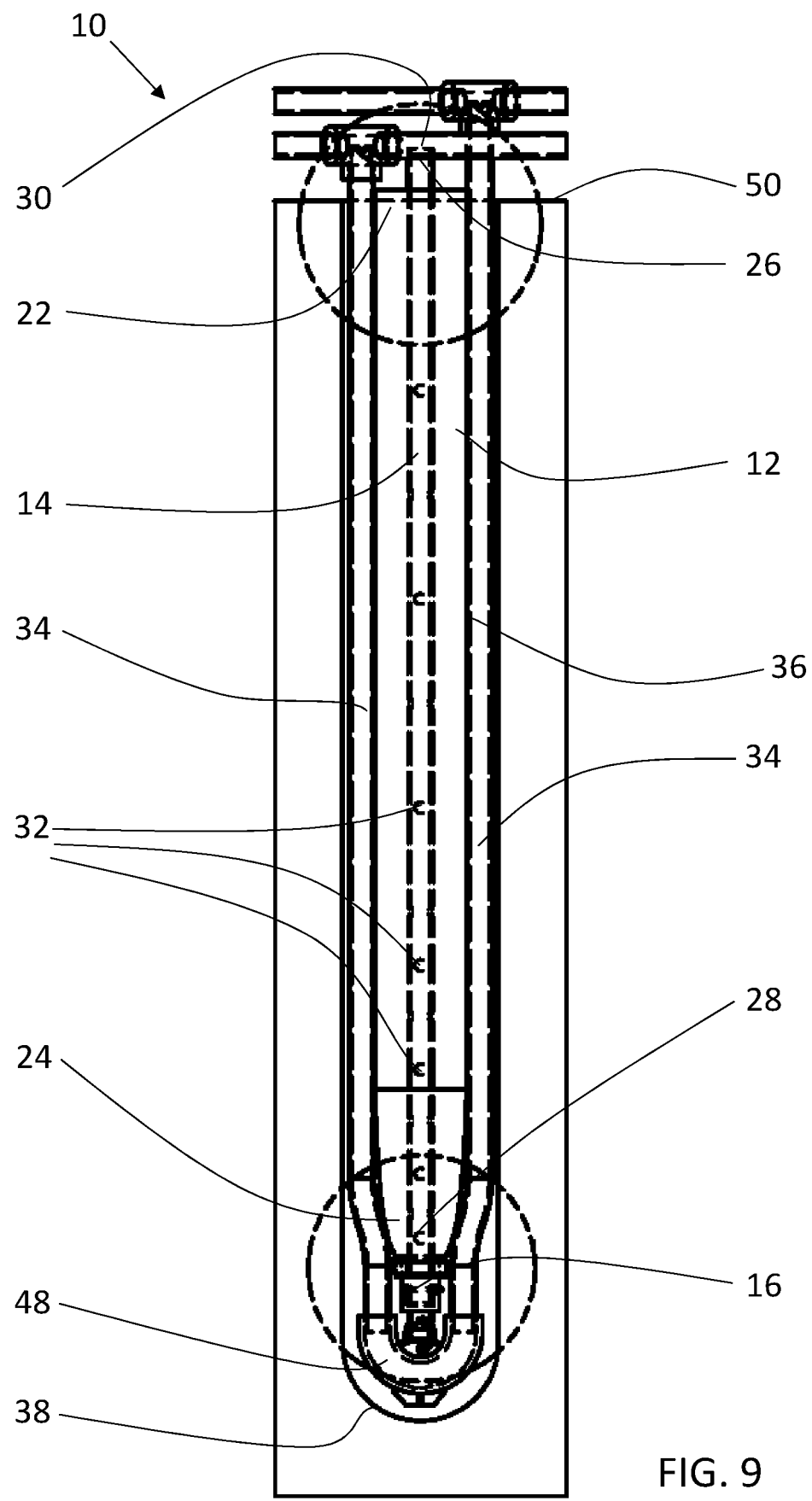
FIG. 9 is a side elevation view, partially in section, of the semi-permeable expanding sleeve system installed within a borehole with an open top end.
Figure 10:
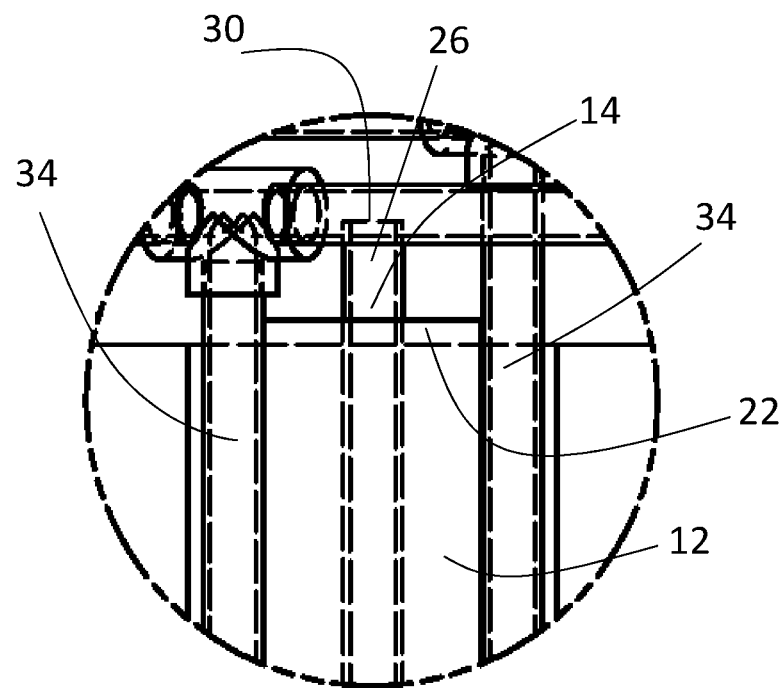
FIG. 10 is a detailed view of the top end of the semi-permeable expanding sleeve shown in FIG. 9.
Figure 11:
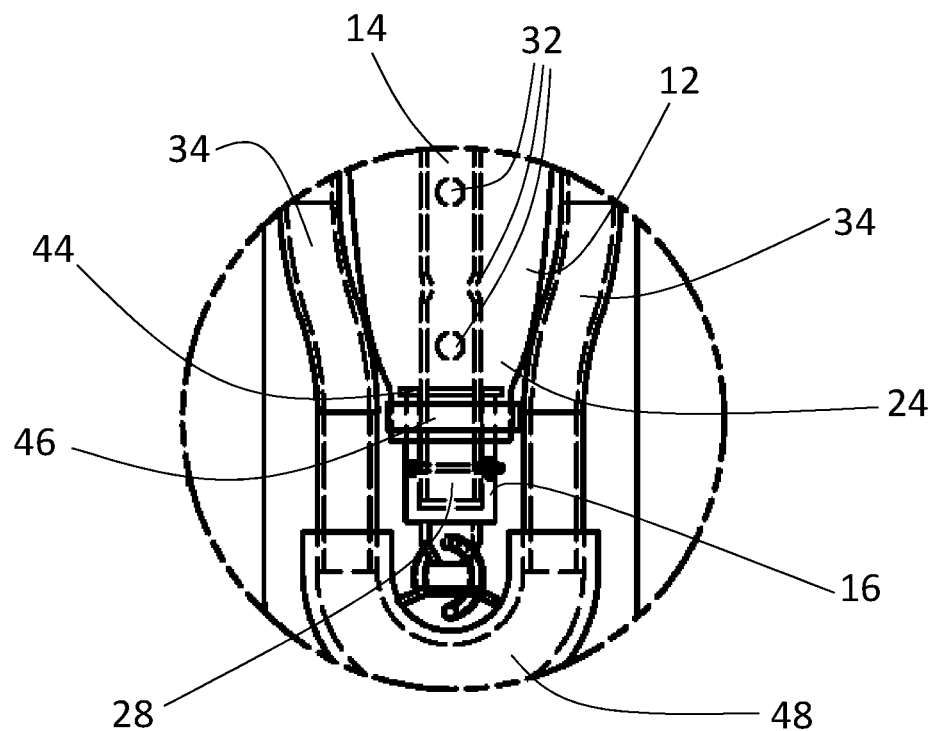
FIG. 11 is a detailed view of the top end of the semi-permeable expanding sleeve shown in FIG. 9.

In an alternative embodiment shown in FIGS. 9-11, top end 22 of expansion sleeve 12 is not closed around grout injection pipe 14 and is simply held to prevent top end 22 from sliding into borehole 38 during grouting. The properties of the semi-permeable fabric and high-solids grout allow system 10 to function properly even when top end 22 of expansion sleeve 12 is open.

Figure 12:
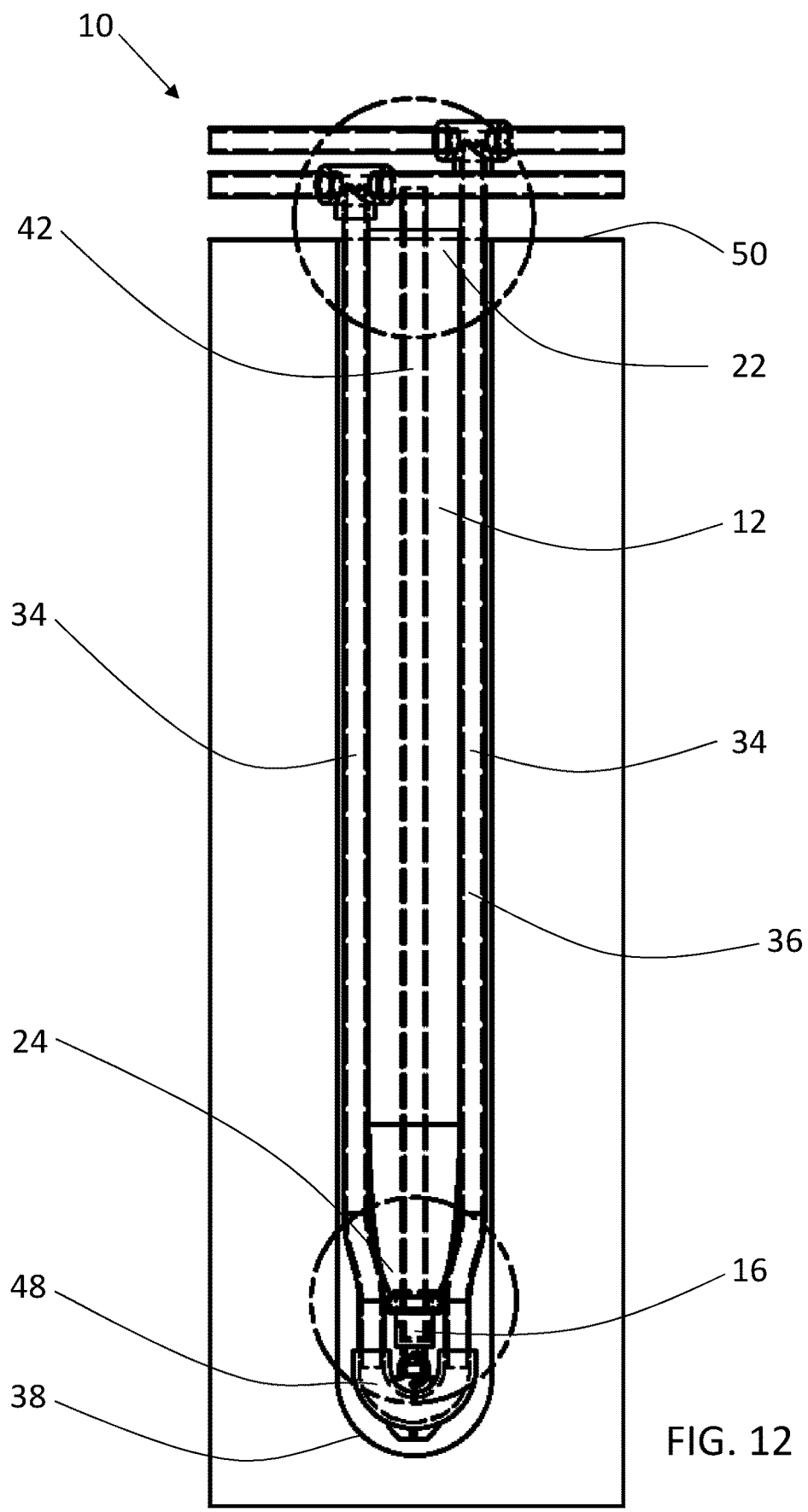
FIG. 12 is a side elevation view, partially in section, an alternative embodiment of the system using a removable tremie line.
Figure 13:
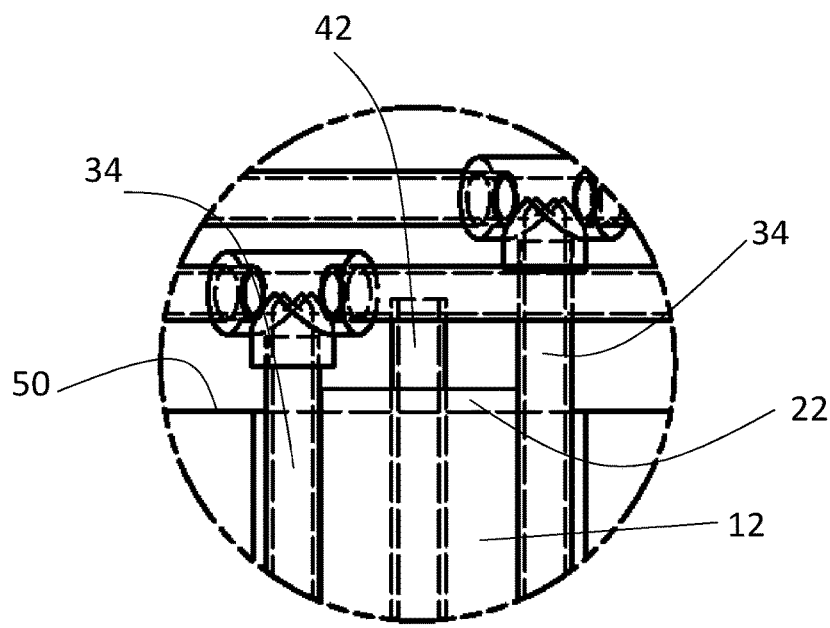
FIG. 13 is a detailed view of the top end of the system shown in FIG. 12
Figure 14:
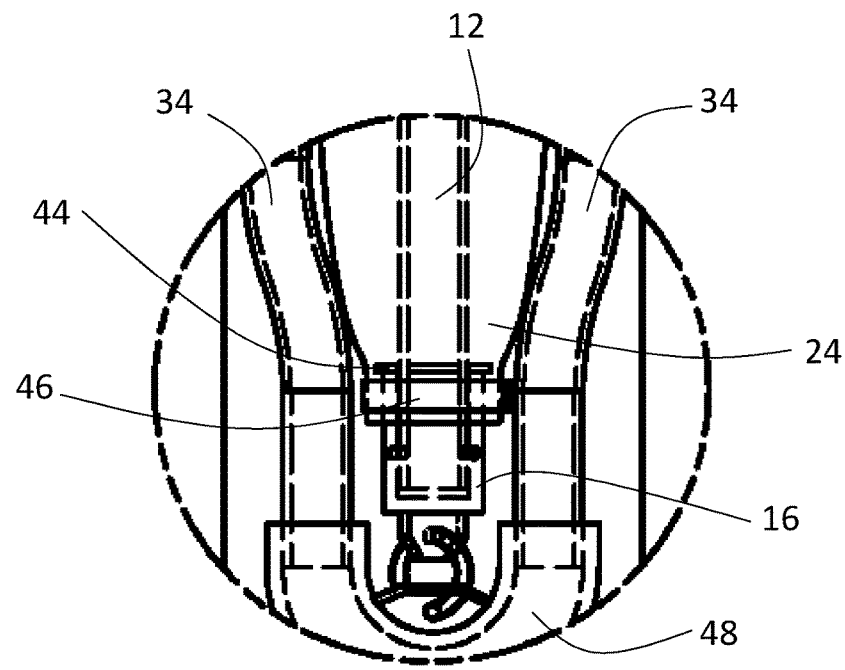
FIG. 14 is a detailed view of the bottom end of the system shown in FIG. 12.

In an alternative embodiment shown in FIGS. 12-14, grout injection pipe 14 is replaced by standard tremie line 42, and tremie line 42 is connected to grout pipe cap 16 with a breakable connector 45. Bottom end 24 of expansion sleeve 12 is closed around grout pipe cap 16 below the flange of grout pipe cap 16 such that flange 44 prevents closure mechanism 46 from sliding off grout pipe cap 16. Top end 22 of expansion sleeve 12 is not closed around tremie line 42. Before the grouting process begins, tremie line 42 is twisted and pulled so that it breaks breakable connector 45 and is free from grout pipe cap 16, and tremie line 42 can be withdrawn during the grouting process.

Figure 15:
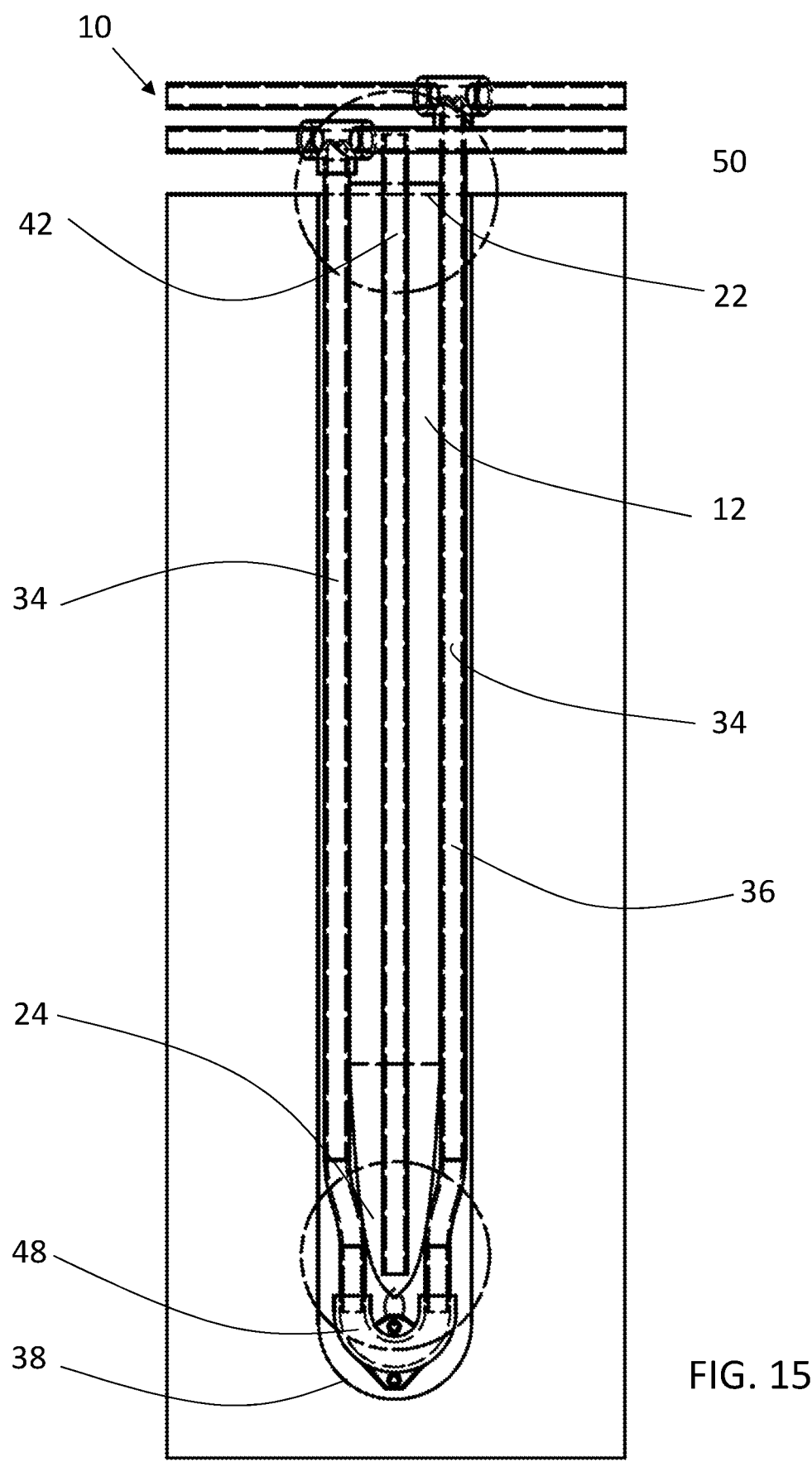
FIG. 15 is a side elevation view, partially in section, of an alternative embodiment of the system using an expanding sleeve with the bottom sewn shut and a removable tremie line.
Figure 16:
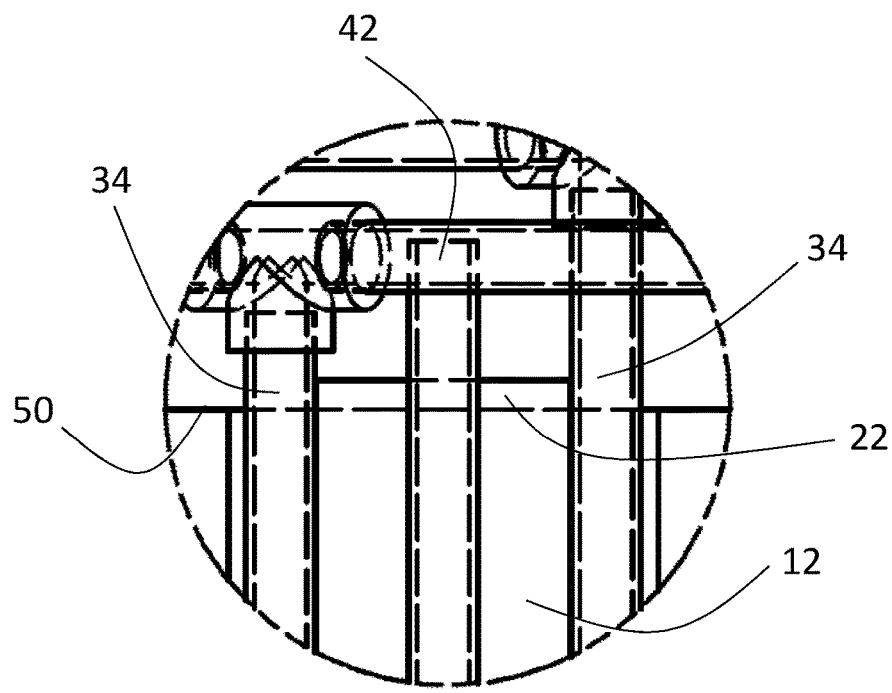
FIG. 16 is a detailed view of the top end of the system shown in FIG. 15.
Figure 17:
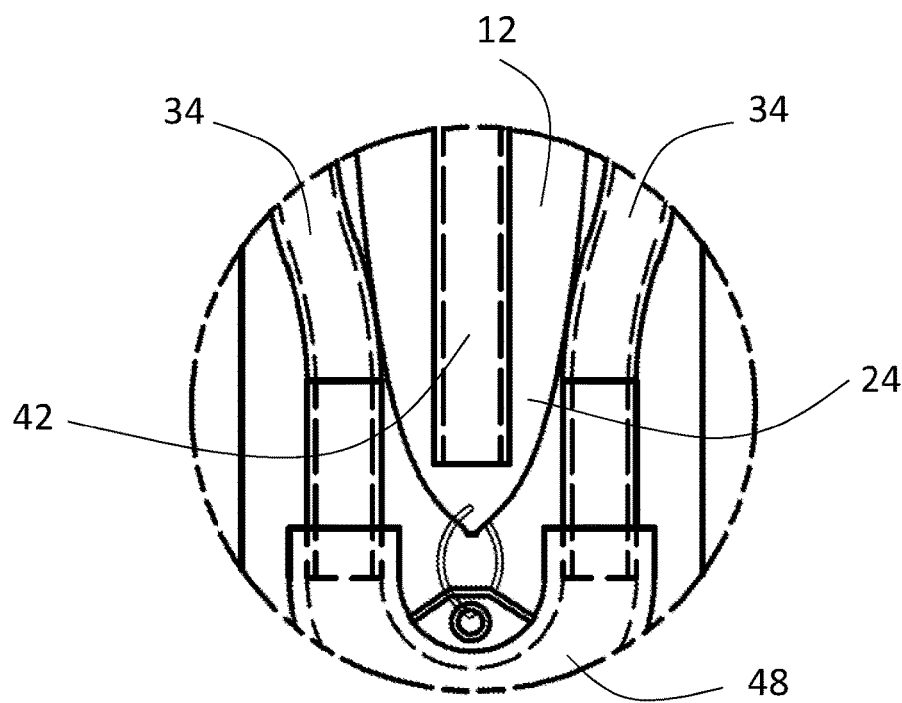
FIG. 17 is a detailed view of the bottom end of the system shown in FIG. 15.

In an alternative embodiment shown in FIGS. 15-17, bottom end 24 of expansion sleeve 12 is sewn closed. In this embodiment, there is no way to connect grout injection pipe 14 to the other components at the bottom of the assembly without puncturing expansion sleeve 12. A tremie line 42 generally replaces injection pipe 14 in this scenario. Bottom end 28 of tremie line 42 is inserted into expansion sleeve 12 through top end 22 of expansion sleeve 12.

Figure 18:
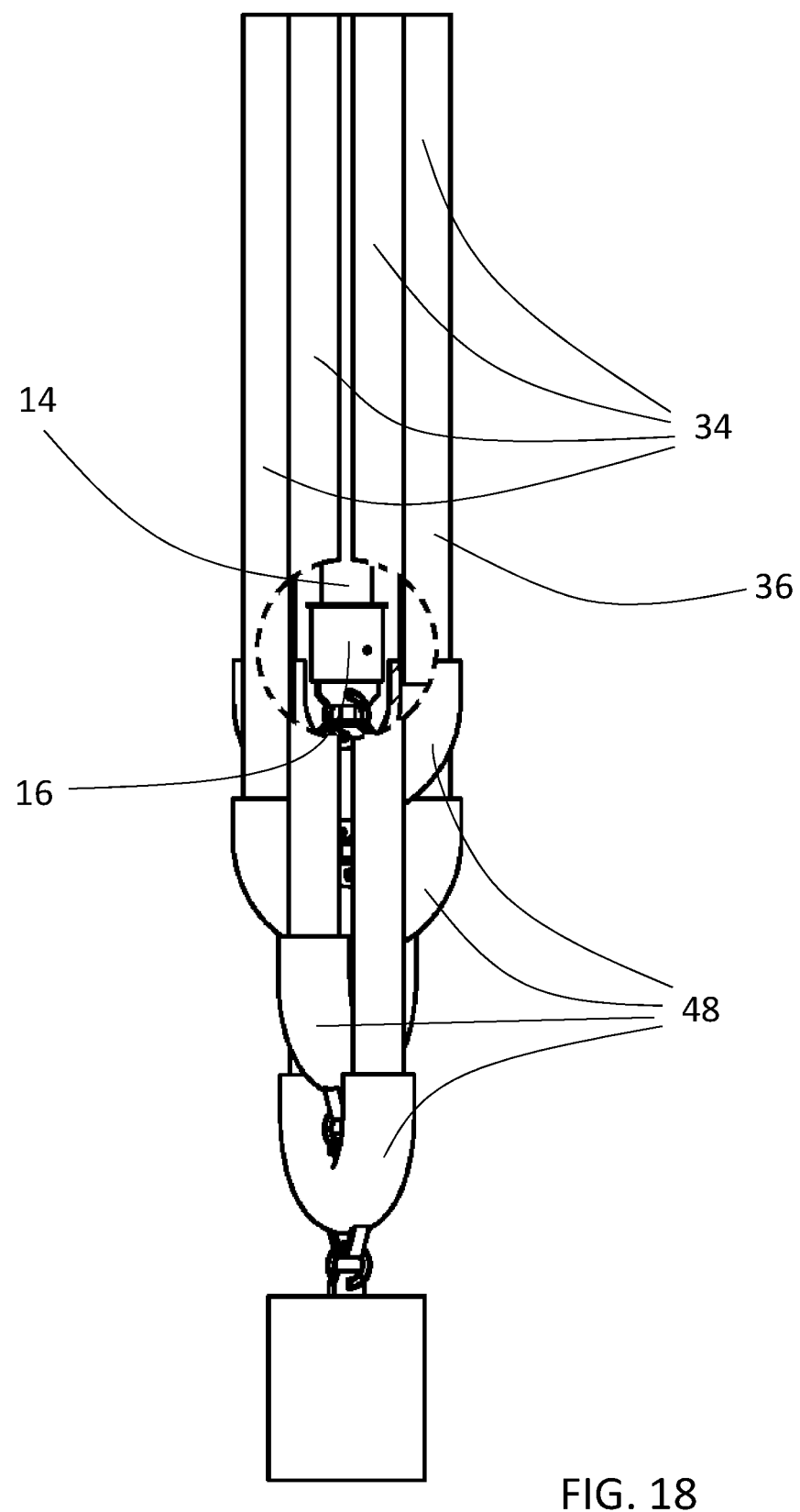
FIG. 18 is a side elevation view of the vertical closed loops as they would be positioned downhole.
Figure 19:
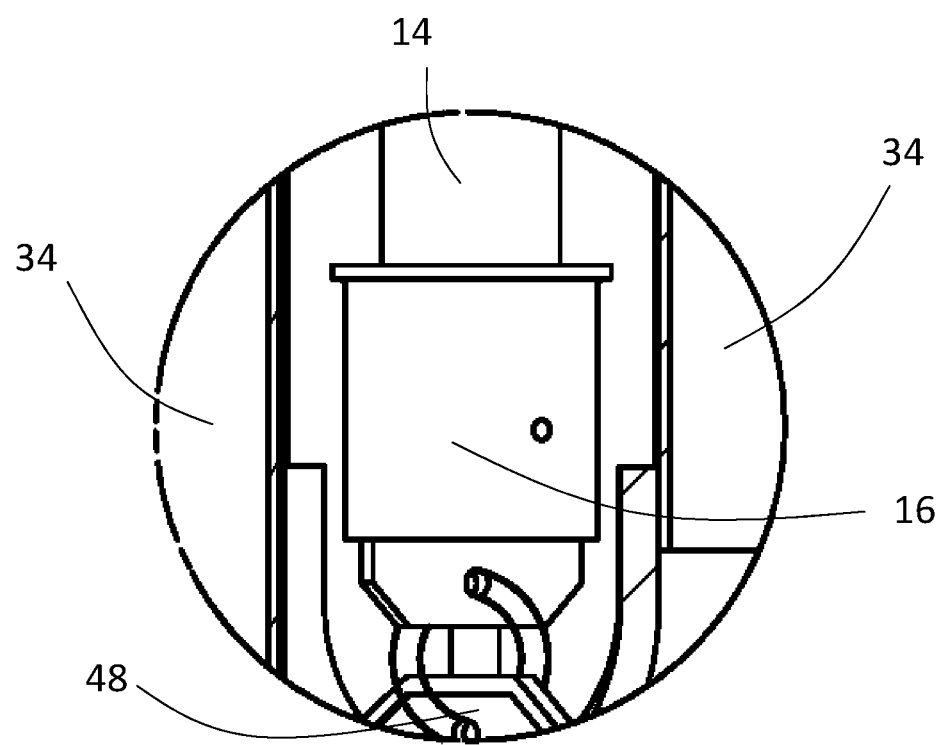
FIG. 19 is a detailed view of the bottom end of the tremie line shown in FIG. 18

Once expansion sleeve 12 and grout injection pipe 14 are combined to create a semi-permeable enclosure, semi-permeable expanding sleeve system 10 is combined with vertical closed-loops (VCLs) 36 to be inserted into borehole 38. Referring to FIGS. 18 and 19, when multiple vertical closed-loops (VCLs) 36 are inserted in the same borehole 38, they are nested within each other at offset angles to ensure a close fit between fittings. U-bend fittings 48 at the end of each vertical closed-loops (VCLs) 36 are then linked together. The bottom end of semi-permeable expanding sleeve system 10 is positioned such that bottom end 26 of grout injection pipe 14 is located between pipes 34 of innermost vertical closed-loops (VCLs) 36. When grout pipe cap 16 is used, group pipe cap 16 is positioned between pipes 34 of innermost vertical closed-loops (VCLs). Grout pipe cap 16 is then linked to U-bend fitting 48 of innermost vertical closed-loops (VCLs) 36. The placement of the bottom end of semi-permeable expanding sleeve system 10 is the only absolute placement possible. Although ideally semi-permeable expanding sleeve system 10 is located exactly between vertical closed-loops (VCLs) 36 for the entire length of piping 34, the flexible nature of the installed system 10 prevents absolute placement. This does not impact the effectiveness of semi-permeable expanding sleeve system 10, as expansion sleeve 12 will push pipes 34 outwards along the entire length of pipes 34 even if there is not ideal placement. In the preferred embodiment, pipes 34 are pushed against borehole walls 40 of boreholes 38 when expansion sleeve 12 is expanded.

Figure 20:
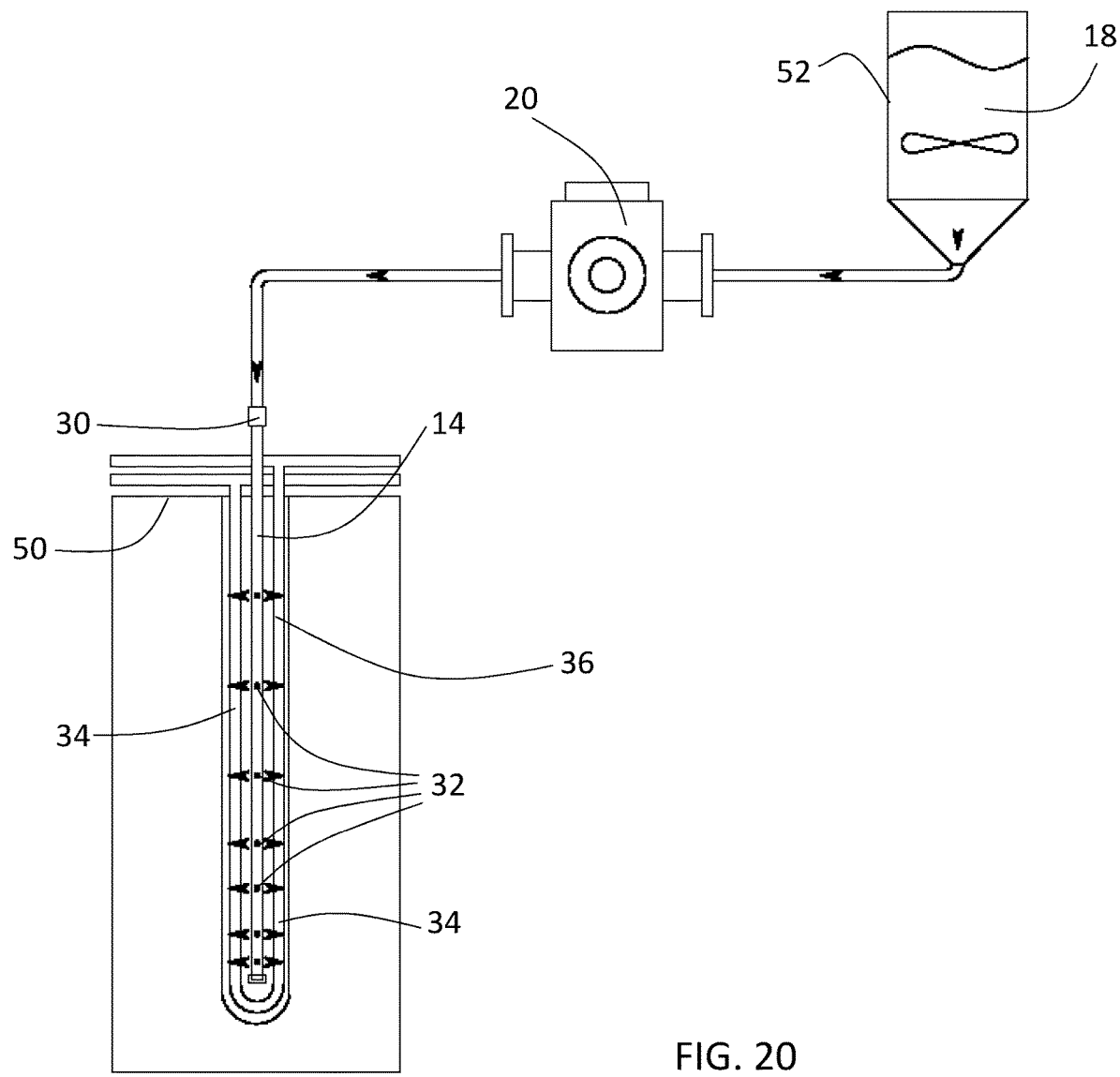
FIG. 20 is a schematic view of the system during the grouting process.

After installation into borehole 38, top end 22 of expansion sleeve 12 should be trimmed, if needed, so that when grout injection pipe 14 is trimmed short after borehole 38 is filled with high-solids grout mixture 18, top end 22 of expansion sleeve 12 can remain closed and undisturbed. If top end 22 of expansion sleeve 12 is below, at, or within 3 inches of the ground level 50 beside borehole 38, no trimming is required. If top end 22 of expansion sleeve 12 is higher than 3 inches above ground level 50, top end 22 of expansion sleeve 12 should be trimmed until it is positioned no more than 3 inches above ground level 50. This recommendation applies to all system embodiments, including when top end 22 of expansion sleeve 12 is closed and when it is open. As shown in FIG. 20, top end 26 of grout injection pipe 14 is connected to pump 20 which is in turn connected to a holding tank 52 which holds high-solids grout mixture 18. A positive-displacement pump is ideal for the requirements of system 10, however a person of skill will understand that other types of pumps 20 in other configurations may also work. High-solids Grout mixture 18 is pumped through inlet 30 of grout injection pipe 14 and flows out through outlets 32 into expansion sleeve 12.

When high-solids grout mixture 18 is pumped into expansion sleeve 12 through grout injection pipe 14, the fabric of expansion sleeve 12 provides resistance to the flow of grout mixture 18. This resistance is driven primarily by the solids (silica sand) within grout mixture 18. The solid particles cling to the fibers of the fabric, partially blocking gaps and reducing the ability of the fluid component (water and bentonite clay mixture) of grout mixture 18 to pass through gaps. The resistance to flow creates an accumulation of high-solids grout mixture 18 within expansion sleeve 12 creating an increasing pressure within expansion sleeve 12 and causing expansion sleeve 12 to expand outwards. Expansion sleeve 12 has the capabilities of occupying a significant space in borehole 38 when expanded and exerts sufficient force on pipes 34 of vertical closed-loops (VCLs) 36 to move them outwards and into contact with borehole wall 40. The semi-permeable fabric of expansion sleeve 12 allows some of high-solids grout mixture 18 to pass through and fill the space between expansion sleeve 12 and borehole wall 40 not otherwise occupied by vertical closed-loops (VCLs) 36. High-solids grout mixture 18 is pumped through grout injection pipe 14 until entire borehole 38 is filled with high-solids grout mixture 14. Once expansion sleeve 12 is completely full, the pressure forces high-solids grout mixture 18 through gaps of expansion sleeve 12 until the voids in borehole 38 outside of expansion sleeve 12 are completely filled. When borehole 38 is visibly filled with high-solids grout mixture 14, the grouting process is considered complete.

Once the grouting process is complete, the connection between pump 20 and grout injection pipe 14 is severed. Grout injection pipe 14 is then cut to length just above top end 22 of expansion sleeve 12 and is plugged. Expansion sleeve 12, grout injection pipe 14 and grout mixture 18 remain in place within borehole 38.

Figure 21:
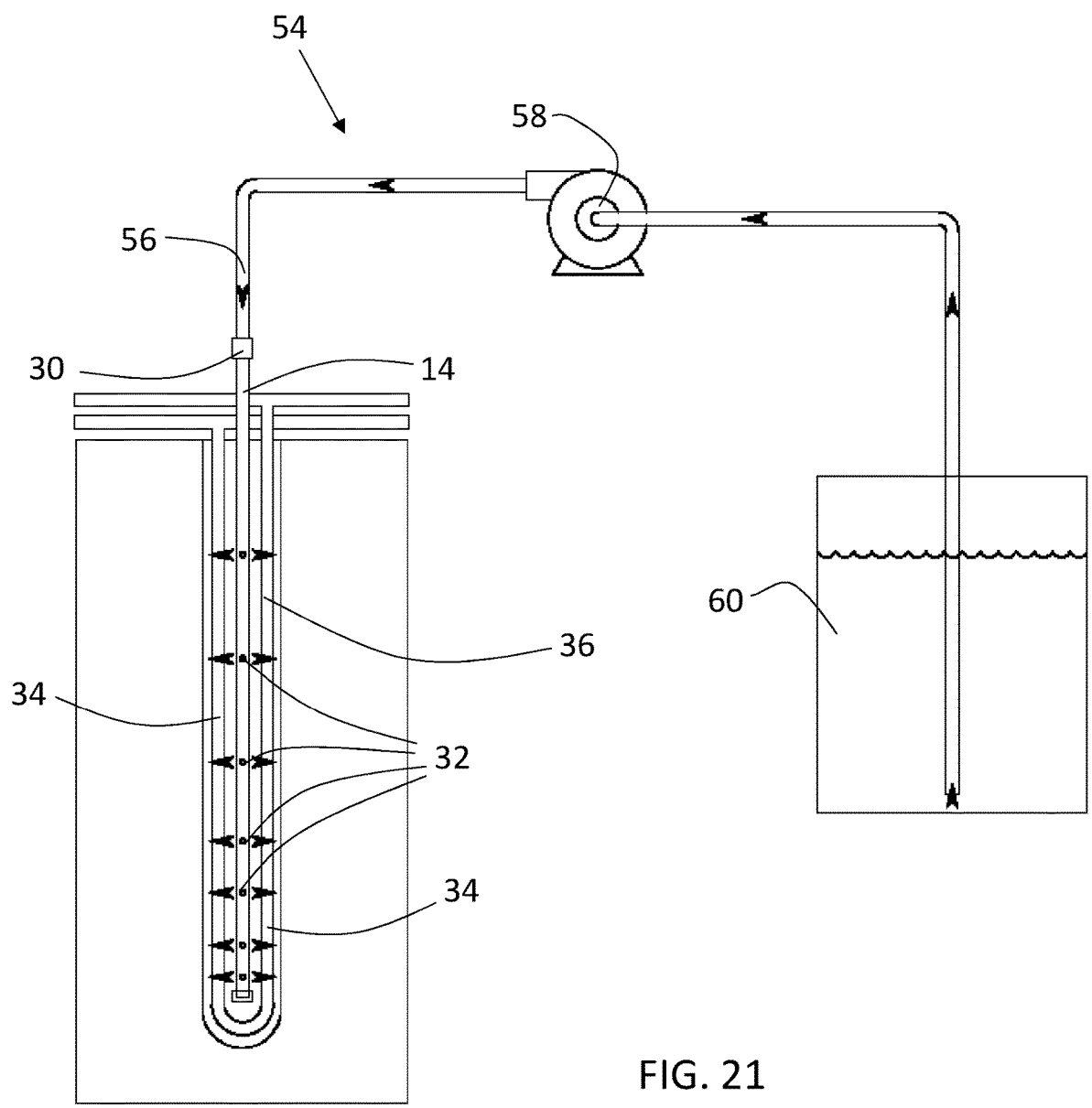
FIG. 21 is a schematic view of a water supply system.

In one embodiment of system 10, shown in FIG. 21, at the completion of the grouting process, grout injection pipe 14 is not cut short and plugged. Instead, grout injection pipe 14 is repurposed as part of a water supply system 54. This water supply system 54 is intended to be used during the operation of high temperature geo-exchange systems to maintain the soil hydration. Under lower temperature conditions (<25° C.) there is little concern of the water content of the geological formation or high-solids grout mixture 18. Under higher temperature conditions (>25° C.), however, there is a concern that the water contained within geological formation and high-solids grout mixture 18 will be driven out of system 10 by the high temperatures. This could occur through migration of the water via convective flow or through evaporation of the water. Given the heat capacity and heat transfer properties of water, the loss of water in the geological formation and high-solids grout mixture 18 can significantly impact the storage capacity and heat transfer efficiency of system 10. Preparation for this system requires purging high-solids grout mixture 18 from grout injection pipe 14. Following the clearing of high-solids grout mixture 18, grout injection pipe 14 is filled with a column of water, removing the air column. Grout injection pipe 14 is then connected to water-supply header 56 and linked together with other grout injection pipes 14 in bore field. Water-supply header 56 is connected to a water pump 58 that is specified and sized to provide a small amount of pressure to the water in water supply system 54. This water pressure is sufficient to ensure that any water migrating from grout injection pipe 14 into high-solids grout mixture 18 in borehole 38 is replaced. It is preferred that water pump 56 is supplied from water tank 60, which is kept full by a source of treated or potable water source so as not to contaminate ground water.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A semi-permeable expanding sleeve system for pipe spreading in a borehole, comprising:
   a semi-permeable expansion sleeve having a top end and a bottom end and sleeve sides;
   a grout injection pipe having a first end, a second end, an inlet and at least one outlet, the grout injection pipe being insertable through the open top end of the expansion sleeve such that the at least one outlet is positionable within the expansion sleeve and the inlet is positionable adjacent the top end of the expansion sleeve;
   a grout mixture;
   a pump for pumping the grout mixture through the grout injection pipe and into the expansion sleeve, and the semi-permeable expansion sleeve allowing a portion of the grout mixture to escape through the sleeve sides; and
   a closing mechanism for closing the expansion sleeve around the grout injection pipe.

2. The semi-permeable expanding sleeve system for pipe spreading in a borehole of claim 1 wherein the expansion sleeve is made of a loose weave fabric having gaps between fibers of 0.03-to 0.08 inches.

3. The semi-permeable expanding sleeve system for pipe spreading in a borehole of claim 1 wherein the expansion sleeve is made of a natural burlap fabric.

4. The semi-permeable expanding sleeve system for pipe spreading in a borehole of claim 1 wherein the expansion sleeve is the same length as the pipes to be spread.

5. The semi-permeable expanding sleeve system for pipe spreading in a borehole of claim 1 wherein the expansion sleeve has a diameter equal to the diameter of the borehole minus two times the outer diameter of the smallest pipe within the borehole.

6. The semi-permeable expanding sleeve system for pipe spreading in a borehole of claim 1 wherein the grout injection pipe is made of plastic.

7. The semi-permeable expanding sleeve system for pipe spreading in a borehole of claim 1 further comprising a grout pipe cap for sealing the bottom end of the grout injection pipe.

8. The semi-permeable expanding sleeve system for pipe spreading in a borehole of claim 1 wherein the grout injection pipe has a plurality of outlets along a length of the grout injection pipe.

9. The semi-permeable expanding sleeve system for pipe spreading in a borehole of claim 1 wherein the grout mixture is made using ratios of water, silica sand, and bentonite clay such that the mixture is at least 50% solids and further is at least 25% sand, by volume.

10. The semi-permeable expanding sleeve system for pipe spreading in a borehole of claim 1 wherein the pump is a positive-displacement pump.

11. A method of spreading pipes in a borehole, comprising the steps of:
    providing a semi-permeable expansion sleeve and a grout injection pipe, the expansion sleeve having a top end and a bottom end and sleeve sides and the grout injection pipe having a top end, a bottom end, an inlet and at least one outlet;
    inserting the grout injection pipe into the expansion sleeve through the top end of the expansion sleeve such that the at least one outlet of the grout injection pipe is positioned within the expansion sleeve and the inlet of the grout injection pipe protrudes from the top end of the expansion sleeve;
    closing the bottom end of the expansion sleeve to create a semi-permeable enclosure;
    inserting the semi-permeable enclosure into a borehole with pipes to be spread such that the semi-permeable enclosure is positioned in a central location of the borehole relative to the pipes to be spread;
    pumping a grout mixture through the inlet of the grout injection pipe such that it travels through the outlet of the grout injection pipe into the expansion sleeve causing the expansion sleeve to fill with grout and forcing the pipes outward towards a wall of the borehole as the expansion sleeve expands, and the semi-permeable expansion sleeve allowing a portion of the grout mixture to escape through the sleeve sides.

12. The method of claim 11 further comprising the step of closing the top end of the expansion sleeve around the grout injection pipe.

13. The method of claim 11 wherein the expansion sleeve is closed around the grout injection pipe with a clamp.

14. The method of claim 11 wherein the expansion sleeve is made of a loose weave fabric having gaps between fibers of 0.03- to 0.08 inches.

15. The method of claim 11 wherein the expansion sleeve is made of a natural burlap fabric.

16. The method of claim 11 wherein the expansion sleeve is the same length as the pipes to be spread.

17. The method of claim 11 wherein the expansion sleeve has a diameter equal to the diameter of the borehole minus two times the outer diameter of the smallest pipe within the borehole.

18. The method of claim 11 wherein the grout injection pipe is a tremie line.

19. The method of claim 11 wherein the grout injection pipe is made of plastic.

20. The method of claim 11 wherein the grout injection pipe is sealed with a grout pipe cap.

21. The method of claim 11 wherein the grout injection pipe has a plurality of outlets along a length of the grout injection pipe.

22. The method of claim 11 wherein the grout mixture contains at least 50% solids by volume and at least 25% sand by volume.

23. The method of claim 11 wherein the pump is a positive-displacement pump.

24. The method of claim 11 further comprising the step of trimming the top end of the expansion sleeve to allow the inlet of the grout injection pipe to protrude from the expansion sleeve.

25. The method of claim 11 further comprising the step of connecting the inlet of the grout injection pipe to a water supply system.

* * * * *